United States Patent
Conrad et al.

(10) Patent No.: US 8,355,472 B2
(45) Date of Patent: Jan. 15, 2013

(54) FREQUENCY DEVIATION ERROR COMPENSATION IN AN MLSE RECEIVER

(75) Inventors: Alan P. Conrad, Geneva, IL (US); Kevin G. Doberstein, Elmhurst, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 391 days.

(21) Appl. No.: 12/768,909

(22) Filed: Apr. 28, 2010

(65) Prior Publication Data

US 2011/0267938 A1 Nov. 3, 2011

(51) Int. Cl.
*H03D 1/04* (2006.01)

(52) U.S. Cl. ........ 375/343; 375/143; 375/152; 375/350; 370/204; 370/480; 370/497

(58) Field of Classification Search .......... 370/203–208, 370/310, 464, 480, 482, 491, 497; 375/260, 375/262, 272, 279, 334, 341, 143, 147, 152, 375/343, 350, 370, 371
See application file for complete search history.

(56) References Cited

U.S. PATENT DOCUMENTS

| | | | |
|---|---|---|---|
| 6,993,097 B2 | 1/2006 | Hammes et al. | |
| 7,117,234 B2 * | 10/2006 | Khlat | 708/270 |
| 2002/0021715 A1 * | 2/2002 | Matheus et al. | 370/480 |

OTHER PUBLICATIONS

J.H. Lodge, et al. "Maximum Likelihood Sequence Estimation of CPM Signals Transmitted Over Rayleigh Flat-Fading Channels," IEEE Transactions on Communications, vol. 38, No. 6, Jun. 1990, pp. 787-794.

* cited by examiner

*Primary Examiner* — Michael Thier
*Assistant Examiner* — Curtis A Alia
(74) *Attorney, Agent, or Firm* — Anthony P. Curtis; Daniel R. Bestor

(57) ABSTRACT

A method is described to compensate for deviation error in a H-CPM sync or data burst received by a MLSE receiver in a communication device. The deviation error is estimated and matched filter coefficients are adjusted using the estimated deviation error. Metrics are determined for the current state using the adjusted matched filter coefficients. The state having the minimum metric is determined to be the most likely current state. The most likely previous state is similarly determined. The burst is reconstructed backward from the last state to the initial state. The metric is the squared magnitude of the difference between the channel estimate multiplied by the matched filter coefficient associated with one of the possible states and the current state. Timing and frequency errors are compensated for before estimation and correction of the deviation error. Pilot or sync symbols are used in estimating the deviation error.

16 Claims, 9 Drawing Sheets

FREQUENCY DEVIATION ERROR COMPENSATION IN AN MLSE RECEIVER

TECHNICAL FIELD

The present application relates to receivers. In particular, the application relates to a device and method for compensating for frequency deviation error in a receiver.

BACKGROUND

Mobile communication devices have become ubiquitous throughout modern life. One of the fields that has benefited enormously from the increasingly-robust connectivity is the public safety realm. In North America, the Association of Public Safety Communication Officials (APCO) Project 25 (P25) is a users group that sponsors the development of standards for digital radio communications in the public safety environment. The next generation of such systems including infrastructure and handsets (also referred to herein as subscriber units) will conform to P25 Phase 2 specifications.

P25 Phase 2 uses a TDMA physical layer protocol modulation scheme different than the legacy FDMA P25 Phase 1 modulation scheme currently in use. More specifically, P25 Phase 2 dictates that Harmonized Continuous Phase Modulation (H-CPM) is to be used as the uplink (handset to base station) modulation protocol of digital data to be transmitted. H-CPM is different from the downlink (base station to handset) modulation protocol specified for P25 Phase 2, Harmonized Differential Quadrature Phase Shift Keying (H-DQPSK), and accordingly engenders different problems and solutions.

While the H-DQPSK technique is similar to the existing modulation schemes used in Phase 1 systems, the use of H-CPM techniques add complexity for receivers. For example, H-CPM techniques are much more computationally-intensive to demodulate and thus use an increased amount of processing and power. Moreover, new receiver tracking algorithm strategies must be determined to minimize the various sources of error for H-CPM techniques.

The sources of error include timing error, frequency error, and deviation error. Timing error is a result of the difference between the assumed symbol timing at the receiver and the true symbol timing. Frequency error results from two main sources: Doppler shift due to relative motion between a transmitter and receiver, and differences in the frequencies of the oscillators of the transmitter and receiver. Radio systems based are designed to conform to specific frequency stability specifications, of which one such example for P25 Phase 1 is a frequency stability of 0.15 parts-per-million (PPM) for base stations and 1.5 PPM for handsets. At a typical frequency of 850 MHz, this corresponds to a frequency error of about 1400 Hz. Assuming that the worst case frequency error due to Doppler shift is about 150 Hz, the maximum expected frequency error becomes about 1550 Hz. Deviation error is due to variance in the components used to convert the modulating signal voltages to frequency in an FM modulator, which causes the frequency deviation of the transmitted signal to differ from the ideal deviation. Systems are also often designed to conform to a maximum deviation error, of which one example for P25 Phase 1 is a maximum deviation error of approximately ±10%.

One type of H-CPM receiver that may be used in P25 Phase 2 (and other) systems processes complex modulated signals in which both in phase (I) and quadrature phase (Q) components are present. Such receivers, unlike those that operate on discriminated output to recover the transmitted signal (e.g., P25 Phase 1 system receivers) can encounter much more difficulty in compensating for the various sources of error.

It would thus be beneficial to enable receivers in P25 Phase 2 and other systems to compensate for deviation error in a received signal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts of the invention defined by the claims, and explain various principles and advantages of those embodiments.

Figure 1:
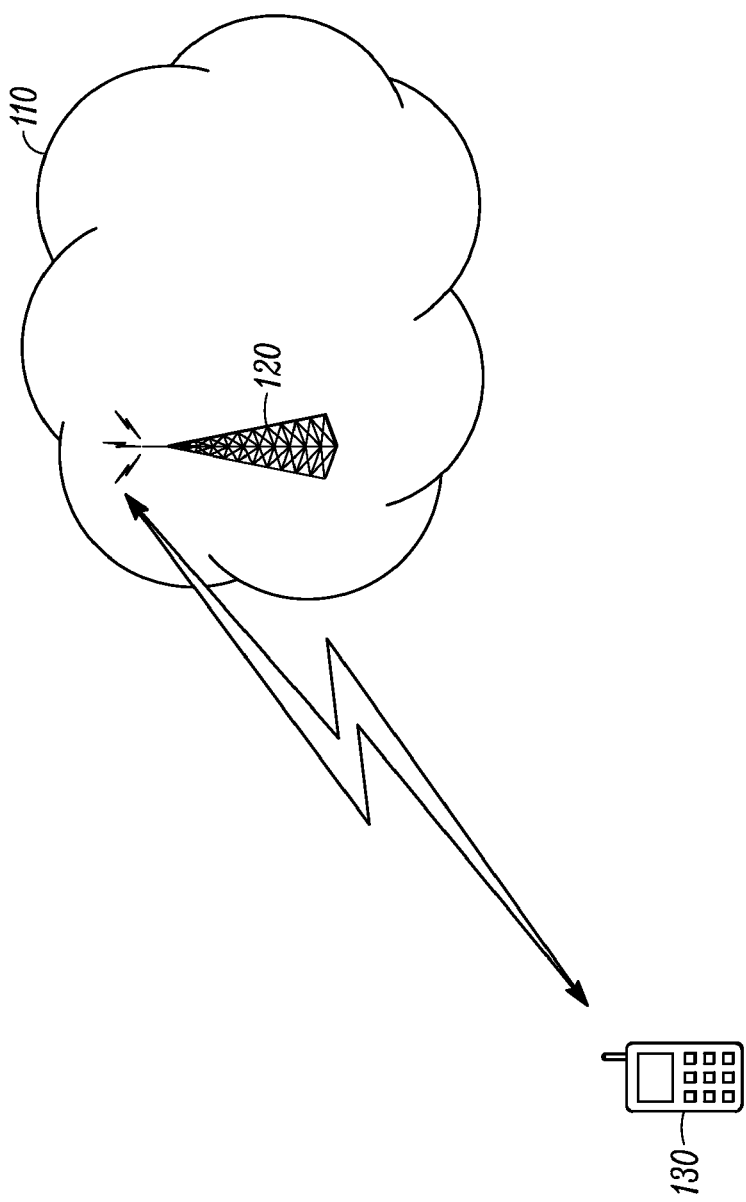
FIG. 1 illustrates one embodiment of a network.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted to facilitate viewing clarity. It will further be appreciated that certain actions and/or steps may be described or depicted in a particular order of occurrence while those skilled in the art will understand that such specificity with respect to sequence is not actually required.

DETAILED DESCRIPTION

Before describing in detail various embodiments, it should be observed that such embodiments reside primarily in combinations of method steps and apparatus components in which the deviation error in a received complex (IQ) signal in a maximum likelihood sequence estimation (MLSE) receiver is minimized by estimating the deviation error of a symbol, using the estimated error to alter hypotheses of the signal based on a set of states, and determining the most likely state using a metric based on the altered hypotheses. The MLSE receiver is disposed in a communication device such as a base station.

Certain portions of this application, such as the Abstract and Summary, are provided to allow the reader to quickly ascertain the nature of the disclosure. They are submitted with the understanding that they will not be used to interpret or limit the scope or meaning of the claims. In addition, in the Detailed Description, various features may be grouped together for the purpose of streamlining the disclosure. This method of disclosure is not to be interpreted as reflecting an intention that the embodiments require more features than are expressly recited in each claim. Rather, as the following claims reflect, inventive subject matter lies in less than all features of a single disclosed embodiment. Thus, the claims are hereby incorporated into the Detailed Description, with each claim standing on its own as a separately claimed subject matter.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that the embodiments described herein may be comprised of one or more conventional processors and unique stored program instructions that control the one or more processors to implement, in conjunction with certain non-processor circuits, some, most, or all of the functions of providing communication redundancy as described herein. The non-processor circuits may include, but are not limited to, a radio receiver, a radio transmitter, signal drivers, clock circuits, power source circuits, and user input devices. As such, these functions may be interpreted as steps of a method for providing communication redundancy. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Throughout this application the term symbol is used to represent the possible values from a quaternary alphabet to which bits are mapped. IQ modulation is well known, the "I" referring to in-phase samples while the "Q" referring to quadrature samples that are 90° advanced from the in-phase samples.

FIG. 1 illustrates a network 100 that includes an infrastructure 110. There are many distributed elements in the infrastructure 110, some local to each other and others disposed geographically distant from each other. Such elements include base stations 120, of which only one is shown for convenience. The base station 120 provides connectivity for subscribers 130 disposed within the coverage area serviced by the base station 120 to other devices either in the same coverage area or in a different coverage area through the infrastructure 110. The subscriber 130 shown may either be a mobile device such as a land-mobile radio, cellular telephone, PDA or a fixed device (i.e., essentially permanently disposed in one location).

The base station 120 has a number of components, including a transmitter and receiver (not shown). As mentioned above, the transmitter and receiver can use the same modulation scheme when transmitting and receiving, or can use different modulation schemes, dependent on the type of communication. This information is provided through, e.g., using a control channel separate from the data channel carrying the audio, video or other data. As above, in systems associated with the P25 Phase 2 standard, the modulation schemes for uplink/downlink are different. Specifically, H-CPM modulated transmissions from the subscriber 130 are received at the base station 120. Each received H-CPM modulated signal undergoes estimation and correction and is demodulated. The information, which has been FEC encoded, is decoded for receive error correction and then re-encoded for error protection during repeat transmission by the base station.

In the P25 Phase 2 standard, the signal received by the base station 120 is a 30 ms burst that includes 2 ms of ramp and guard time and has 180 symbols. As in the P25 Phase 1 standard, each symbol consists of 2 bits. Each H-CPM burst is a sync burst or data burst that contains 4 pilot symbols at the beginning and 4 pilot symbols at the end. Pilot symbols are a sequence of symbols that are constant, inserted at one or more particular locations within a burst, and are known by the receiver. Sync symbols, which are only present within the sync burst, consist of 22 symbols that include the four pilot symbols at the beginning of the burst. Sync symbols are a sequence of symbols that are constant, inserted at one or more particular locations within a burst, known by the receiver, and used by the receiver to synchronize timing. The remaining symbols located between sync/pilot symbol sections, are used for signaling or data payload. The H-CPM modulation has a nominal symbol rate of 6 ksym/sec and a 12 kbps bit rate.

Figure 2:
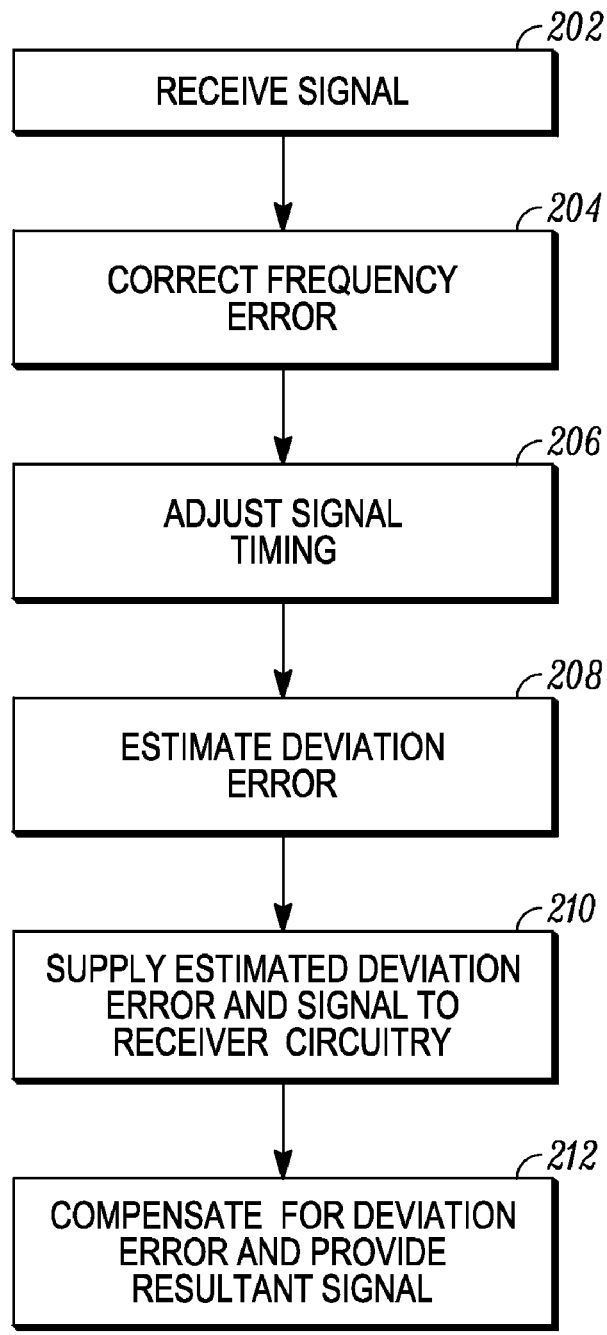
FIG. 2 illustrates a flowchart of a method of one embodiment of compensating for deviation error in a received signal.
Figure 3:
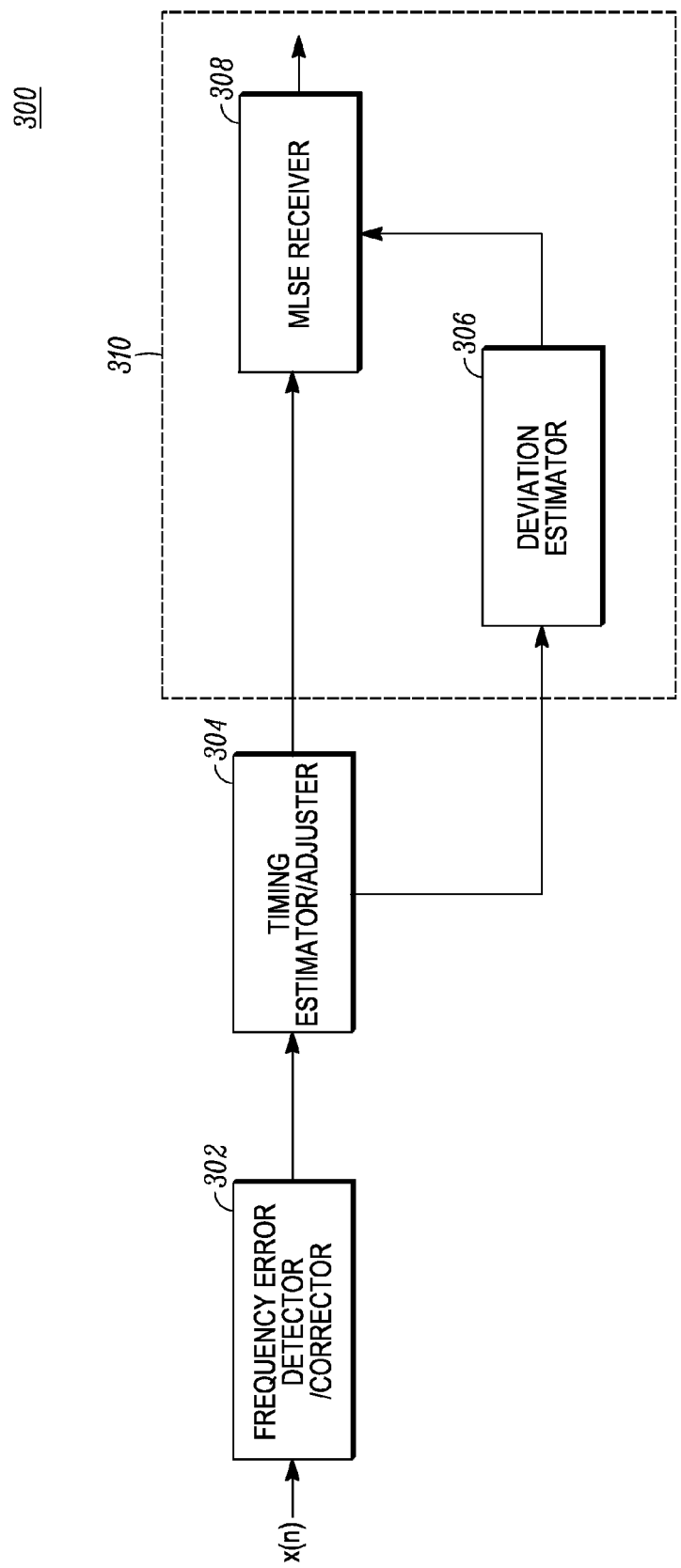
FIG. 3 illustrates a block diagram of one embodiment of a portion of a receiver.

A method of providing an estimated signal is shown in FIG. 2 and corresponding elements of a receiver 300 are shown in FIG. 3. The signal is received by the receiver 300 at step 202 and the frequency error is minimized at step 204 by one or more components 302 that detect and correct for the frequency error in the received signal. The timing of the signal is then detected at step 206 by one or more components 304 that estimate and then adjust for the timing errors. Correcting the frequency error, at least coarsely, before estimating the timing removes a significant amount of the frequency error so that the frequency error does not substantially interfere with the timing estimate. In some methods, the frequency error detection can be provided in stages (e.g., a coarse and fine correction), at least one of which is provided before and at least one of which is provided after the timing estimation and adjustment.

Methods of detection and correction, such as autocorrelation, of the frequency and timing errors are known in the art and thus will be mentioned but will not be described in detail herein. Non data-aided and/or data-aided mechanisms, such as use of the above-mentioned pilot symbols or decision directed feedback techniques, may be employed in timing and frequency error estimation and correction. Decision directed feedback schemes use decoded data from previous bursts or symbols in the estimate at the current burst or symbol, which can increase the precision of the estimation and correction.

After the signal is compensated for frequency error and adjusted for timing at steps 204 and 206, it is supplied to a deviation error estimator 306 in the receiver 300. The deviation error estimator 306 estimates the deviation error $\Delta\alpha$ at step 208, which is then supplied along with the frequency and timing adjusted signal to an MLSE receiver 308 at step 210. Details of an MLSE receiver can be found, for example, in section 4.1.3 of the P25 Phase 2 Physical Layer document, TIA-102 BBAB, July 2009 herein incorporated by reference in its entirety. In one embodiment, the MLSE receiver 308 is an IQ-based Viterbi receiver. The estimated deviation error is used in a matched filter construction block (not shown in FIG. 2) of the MLSE receiver 308 to compensate for the deviation error and provide a set of matched filter coefficients at step 212. The combination of the deviation error estimator 306 and MLSE receiver 308 form the deviation compensation mechanism 310 outlined by the dashed line in FIG. 3.

As stated above, deviation error is the difference between the deviation of the transmitted signal from the ideal deviation and is generally a result of transmitter component variance. This component variance causes the transmitted signal to be either over or under-deviated when the signal is modulated in the transmitter leading to demodulation errors in the receiver. In one embodiment, a pilot-based maximum likelihood estimation technique (i.e., using pilot symbols in the signal) is employed by the deviation error estimator 306 to determine the deviation error.

Mathematically, to determine the deviation error, a sample stream received at the deviation error estimator is modeled as:

$$x[n] = e^{j\alpha q_p[n]} w[n] \quad (1)$$

where $\alpha$ is the deviation, $q_p[n]$ is the phase waveform of the received pilot symbol sequence over which the estimate is calculated and $w[n]$ represents an Additive White Gaussian Noise (AWGN) sequence. By multiplying $x[n]$ with the complex conjugate of the IQ samples obtained from modulating the known pilot symbol sequence having ideal deviation, the deviation error is represented in the result:

$$r[n] = x[n] e^{-j\alpha_0 q_p[n]} = e^{j(\alpha-\alpha_0) q_p[n]} + w_r[n] \quad (2)$$

In general, the ideal deviation is dependent on the quaternary symbol values used. The known symbol sequence can be the pilot symbol sequence and/or the sync symbol sequence. It is desirable to use longer known symbol sequences as this increases the reliability of the estimate. The estimate of the deviation error, $\tilde{\alpha} = \alpha - \alpha_0$, is computed from $r[n]$ as:

$$\tilde{\alpha} \cong \frac{\text{Im}\left\{\sum_{k=1}^{N-1}\sum_{i=k}^{N-1} r[i]r^*[i-k](q_p[i] - q_p[i-k])\right\}}{\text{Re}\left\{\sum_{k=1}^{N-1}\sum_{i=k}^{N-1} r[i]r^*[i-k](q_p[i] - q_p[i-k])^2\right\}} \quad (3)$$

where N is the number of samples used in the estimate, Im{.} is the imaginary part of the argument and Re{.} is the real part of the argument. The estimate of the deviation error as shown in equation (3) assumes that the magnitude of the phase of the complex exponential in equation (2) is small, i.e., <<1. A large phase magnitude will lead to errors in the estimate of the deviation error.

As above, in various embodiments, a number of successive transmitted bits are mapped to a quaternary symbol alphabet. For example, as a pair of bits forms a symbol, there are four possible values in the symbol alphabet +1, +3, −1, −3 corresponding to the bit pairs 00, 01, 10, 11. In one such embodiment, a state is formed from a combination of two or more symbols, but in other embodiments additional information such as the correlative state may also be used as described in section 4.1.3 of the P25 Phase 2 Physical Layer document, TIA-102 BBAB. In the embodiment described here, a combination of the current state and the immediately previous state thus contains at least one symbol that is shared by both states. The shared symbols in the current state determine the possible previous states, thereby forming a "trellis" structure. Thus, the current state is the state in the trellis that is currently being processed (e.g., whose metrics are being determined or whose actual state is being determined during traceback). The complexity of the trellis, and the number of state transitions, increases as the number of symbols forming a state increases.

The receiver compares an implementation-specified time slice of the received signal with signal hypotheses that correspond with that time slice and that are constructed from the current state and its possible previous states to determine the most likely previous state. This is repeated using each state of the trellis as the current state and over all time slices of the received signal. Specifically, the receiver translates each hypothesis into a waveform and compares this waveform with that of the received signal over a particular time slice using a matched filter. The receiver also maintains an array in which a most likely previous state, once determined, is associated with each of the trellis states. For example, if two symbols form a state, each current state can have 4 possible previous states and thus 4 possible state transitions. However, because the sequence of state transitions are not known with certainty, the receiver maintains the array in a memory until it is ready to determine the most likely sequence and thus the most likely received bit stream.

The receiver is ready to determine the most likely sequence of state transitions when the current state can be determined with sufficient reliability, which usually occurs at the end of the burst by way of the known terminal pilot symbols. At this point, the array is employed to determine the most likely sequence of state transitions by working backward from the most likely current state. The most likely previous state for a current state is selected as the state with the minimum metric. The metric is dependent on the implementation.

As above, however, the current and previous state decisions are complicated by the deviation error, which can distort the received signal such that the correct hypothesis of the received signal becomes less likely than an incorrect hypothesis of the received signal. In addition, environmental effects of the signal path from the transmitter to the receiver (channel effects) can further influence the determination of the most likely hypothesis.

Figure 4:
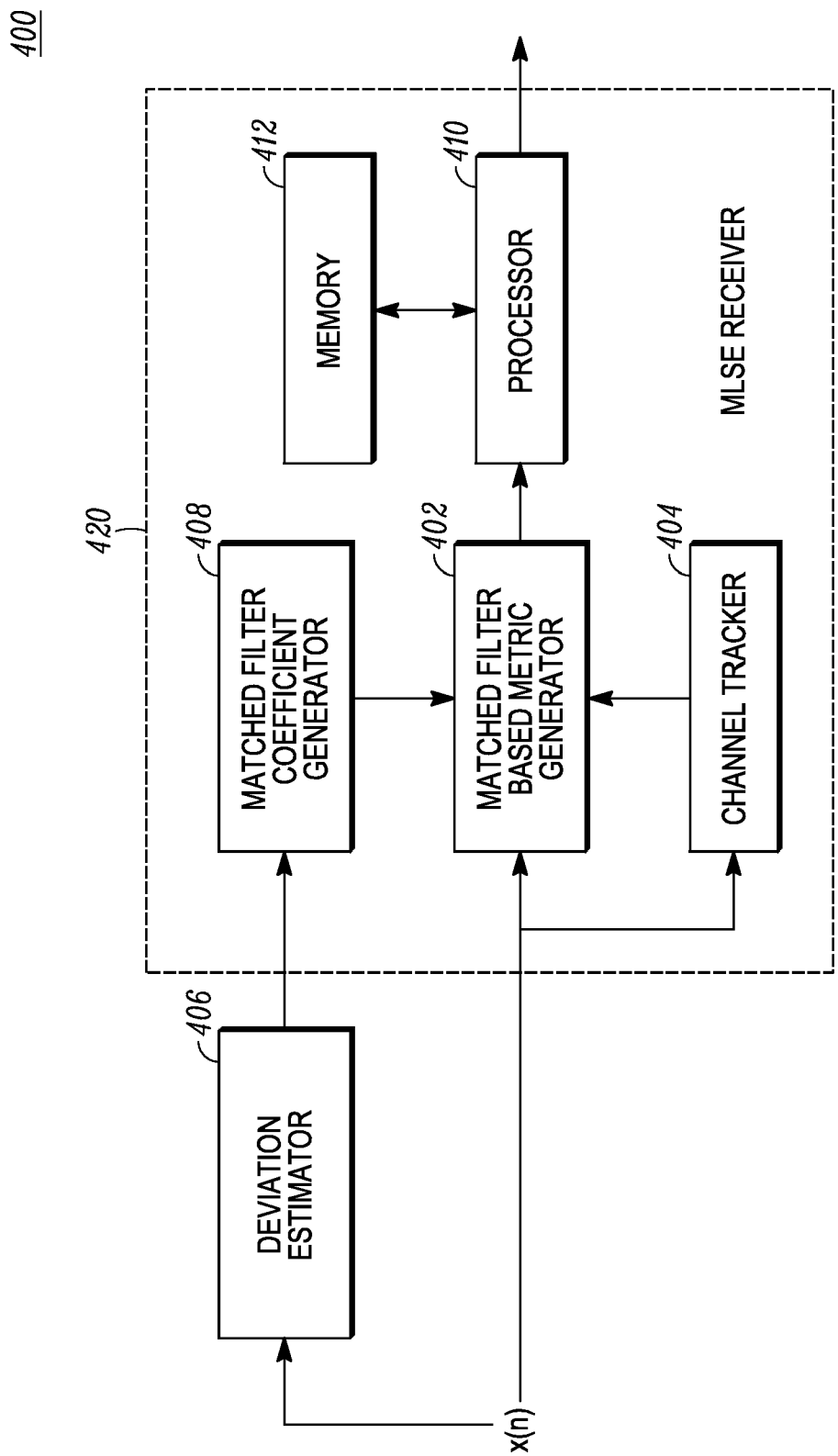
FIG. 4 illustrates one embodiment of a block diagram of the MLSE receiver of FIG. 3.

To correct for these errors, a block diagram of an embodiment of the deviation error compensation mechanism 400 is shown in FIG. 4. The deviation error compensation mechanism 400 includes a deviation estimator 406 that receives an adjusted signal (i.e., the input signal for which both the frequency and time error have been corrected) and the MLSE receiver 420. The deviation estimator 406 estimates the deviation and supplies this estimate to a matched filter coefficient generator 408. The matched filter coefficient generator 408 supplies a set of matched filter coefficients to a matched filter based metric generator 402. The coefficients of the matched filters generated at 408 ($M_k[n]$) are thus modified based on the estimated deviation. This adjustment may be the same for each matched filter coefficient or may differ among the matched filter coefficients (i.e., the modification may change with time). Such an arrangement permits the output of the matched filter based metric generator 402 to be adjusted contemporaneously with the received signal based on an instantaneous estimation of the deviation error. It is likely, however, that any change in the deviation error (and thus adjustment) will occur relatively slowly over time, for example, as the temperature of the transmitter changes or as the transmitter components age.

The set of matched filter coefficients generated by the matched filter coefficient generator 408 are derived from all possible symbol combinations as defined by the number of symbols inherent to valid transitions between states and are analogous to signal hypotheses defined by the state transition. In other words, the set of matched filter coefficients is the same as the above signal hypotheses. Thus, each matched filter uses a combination of the previous possible states as well as the current state to generate an output.

Figure 5:
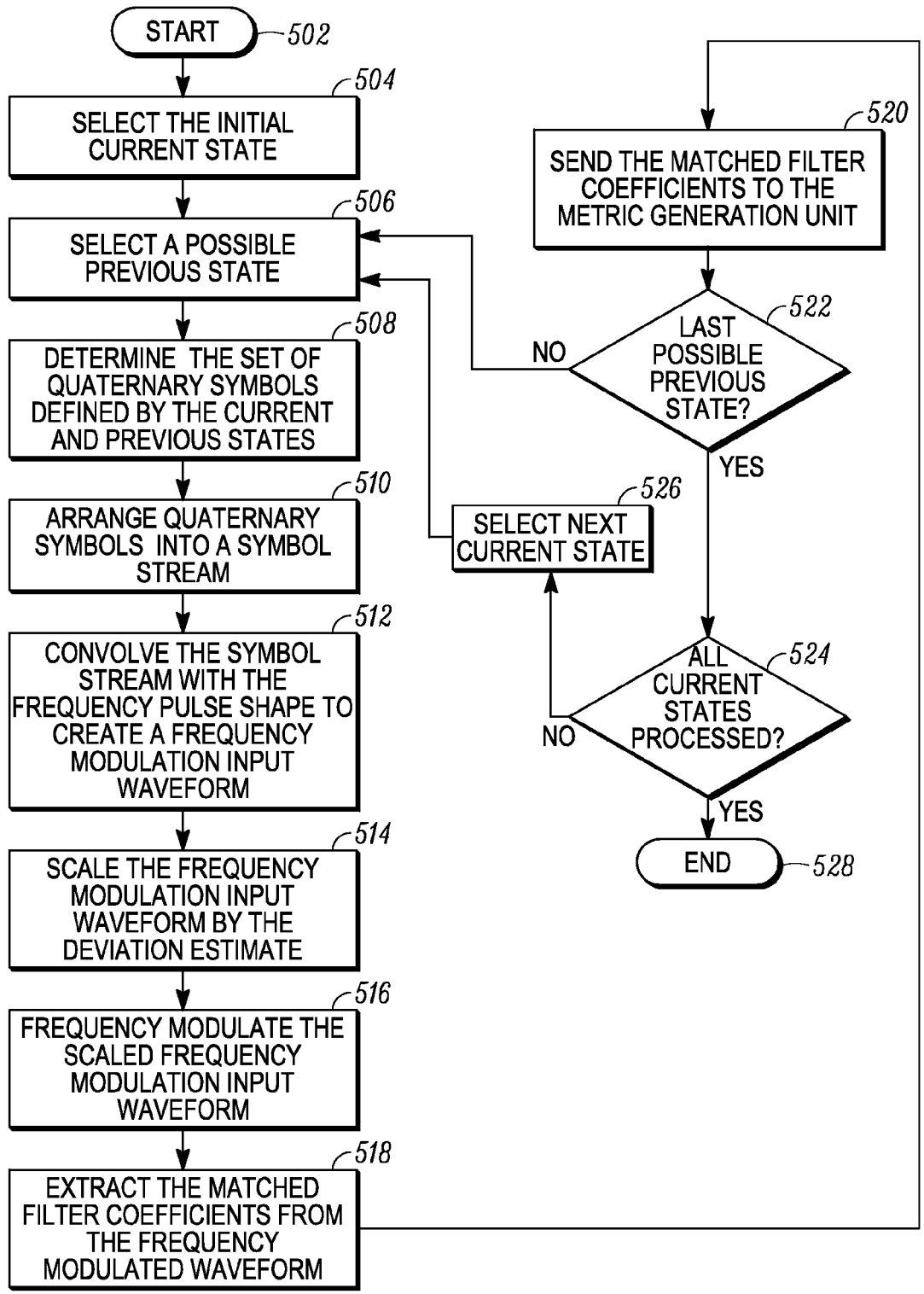
FIG. 5 illustrates one embodiment of a flowchart of how the deviation estimate is applied to matched filter generation.

The flowchart of FIG. 5 illustrates one embodiment of the operation of the matched filter coefficient generator 408. Once the deviation estimator 406 supplies an estimated deviation to the matched filter coefficient generator 408 at step 502, an initial current state is selected from all possible states at step 504. The first possible previous state (out of all possible previous states) of the current state is selected at step 506 and the set of quaternary symbols defined by the current and previous states is determined at step 508. For example, if each state is defined by two quaternary symbols, three quaternary symbols are defined by the current and previous states.

At step 510 the quaternary symbols are arranged into a symbol stream such that the current and previous states are arranged in temporal order, with the overlapping quaternary symbols appearing only once in order, as shown in the example provided later. In one embodiment, the symbol stream is a series of impulse functions scaled by the appropriate positive or negative magnitude of the quaternary alphabet. The symbol stream is then convolved at step 512 with a predetermined frequency pulse shape to create a frequency modulation input waveform. The pulse shape is dependent on the particular modulation scheme used by the transmitter/receiver and drives the spectrum of the modulated signal. For example, for H-CPM modulation, the frequency pulse shape, g(t) is defined in the TIA P25 Phase 2 standard as:

$$g(t) = \begin{cases} \frac{1}{G} sinc\left(\lambda\left(\frac{t}{T_s} - \frac{L}{2}\right)\right) cos^2\left(\pi\left(\frac{t}{LT_s} - \frac{1}{2}\right)\right) & \text{for } t \in [0, LT_s] \\ 0 & \text{elsewhere.} \end{cases} \quad (4)$$

where sin c(x) is equal to sin (πx)/πx, λ is 0.75, $T_s$ is the symbol period, L is an integer pulse width of 4 symbols. The value of L specifies the number of symbols over which phase changes are spread. A value of L greater than 1 indicates that H-CPM uses a partial response signaling scheme where phase changes are spread across multiple symbols (4 in the case of H-CPM). The G term is a scale factor such that the phase pulse, q(t), which is defined as the integral over t of the frequency pulse, is confined to the set $q(t) \in [0, \frac{1}{2}]$.

As is apparent, each combination of symbol stream defined by the current and previous states when convolved has its own unique frequency pulse shape. At step 514 the frequency modulation input waveform is then scaled in magnitude using the deviation estimate obtained from the deviation estimator 406 and at step 516 the scaled frequency modulation input waveform is frequency modulated to create a complex IQ signal (frequency modulated waveform). The matched filter coefficients are then extracted from this complex IQ signal at step 518 and supplied to the matched filter metric generator 402 at step 520. Extraction of the matched filter coefficients at step 518 depends on the temporal lengths of the complex IQ signal and the time slice used by the receiver. In other words, if the temporal length of the complex IQ signal is equal to the temporal length of the time slice, the complex IQ signal is employed while if the temporal length of the complex IQ signal is larger than that of the time slice, the complex IQ signal is clipped so that only a portion is used.

This process is repeated until it is determined at step 522 that the last possible previous state has been reached. This is to say that if it is determined that the matched filter coefficients of other possible previous states of the current state have not been previously determined, the process returns to step 506, where the next possible previous state of the current state is selected. In one embodiment, if the current state is composed of symbols +1, +1 and the possible symbols are selected from +1, +3, −1, −3, four possible previous states could exist, whose symbols would be: +1,+1; +1,+3; +1,−1; +1,−3. The symbol stream for a current state of +1,+1 and previous state +1,−3 would thus appear as −3,+1,+1.

Once it has been determined at step 522 that the matched filter coefficients for all of the combinations of possible previous states and the current state have been extracted and supplied to the matched filter metric generator, the matched filter coefficient generator determines at step 524 whether all current states have been processed. If not, the next current state is selected at step 526 and the process returns to step 506 where a possible previous state of the next current state is determined If it is determined at step 524 that matched filter coefficients have been generated for all of the current states, the process terminates at step 528. The matched filter coefficients are thus a reconstruction of the signal over the time slice used by the receiver.

In the embodiment shown in FIG. 5, matched filter coefficients are generated only once for each burst. Once generated, the matched filter coefficients are stored in memory of the receiver and recalled by the processor of the receiver (which is able to communicate with the memory) at the appropriate time for each time slice. As above, as the deviation estimate generally changes relatively slowly over time, it may be beneficial to calculate the matched filter coefficients only once per burst (or over several bursts), for example, to save processing, reducing power consumption and speeding up signal reproduction. However, if accuracy of the matched filter coefficients is paramount, in another embodiment, the matched filter coefficients can be determined for each time slice or at some, but not all time slices within the burst. Thus, in such embodiments, the process shown in FIG. 5 can be performed at some or all of the time slices.

Turning back to FIG. 4, the matched filter coefficients are supplied to the matched filter based metric generator 402, which produces the branch metrics for the possible previous states of each current state. In a coherent receiver embodiment, the output of the matched filter based metric generator 402 is proportional to the magnitude squared of the corrected signal received by the matched filter based metric generator 402 less the combination of the channel estimate multiplied by the matched filter coefficients representing the current hypothesis. Mathematically, the output of the matched filter based metric generator 402 is thus:

$$y[n] = |x[n] - c_k[n] * M_k[n]|^2 \quad (5)$$

where x[n] is a vector of corrected received signal samples, $c_k[n]$ is the channel estimate for state k and $M_k[n]$ is the matched filter coefficient for state k.

A channel tracker 404 provides the channel estimate ($c_k[n]$) to the matched filter based metric generator 402. The channel tracker 404 calculates the channel estimate from the corrected signal. As noted previously, the channel tracker 404 is used to adjust the metric generator 402 for distortions of the received signal caused by channel characteristics, which include the environment between the transmitter and receiver.

Figure 6:
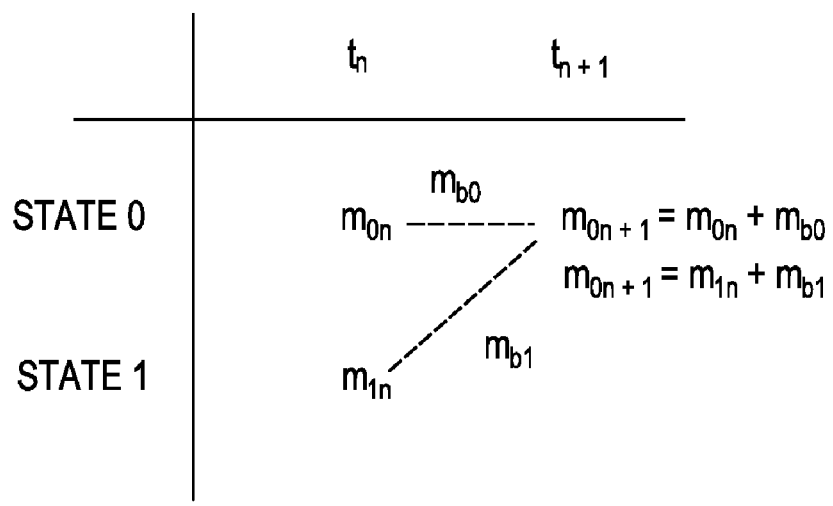
FIG. 6 illustrates one embodiment of the metric calculation process of FIG. 5.
Figure 6:
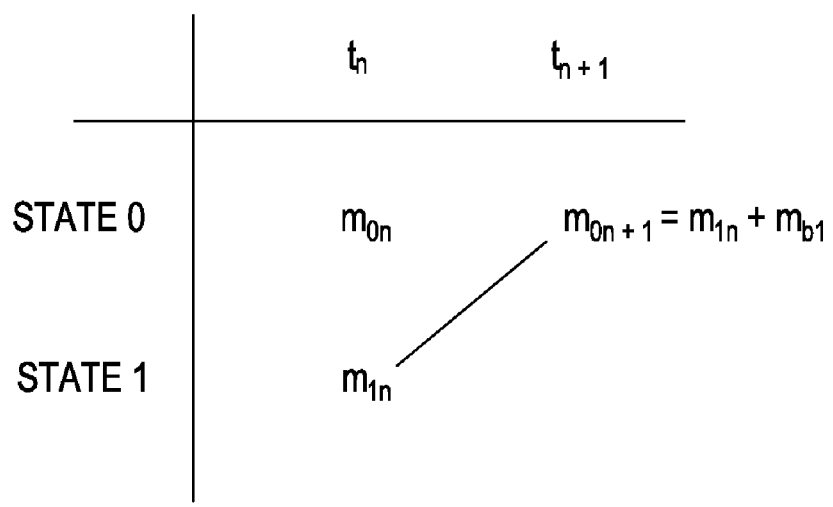

The output from the matched filter based metric generator 402 is supplied to a processor 410. The processor 410 sums the values of the branch metrics from the matched filter based metric generator 402 for each hypothesis, determined from the current state and its possible previous states, with the path metrics. The path metrics are defined as the cumulative metric chosen from the most likely path into the previous state. The processor 410 compares the sum of the path and branch metrics for each previous state into the current state, finding the most likely previous state based on the minimum sum of the branch metric from the matched filter based metric generator 402 and the path metric into the previous state. A simple illustration of this concept is shown in FIG. 6 in which $m_{0n}$ and $m_{1n}$ are the path metrics of state 0 and 1, respectively, at time $t_n$, and $m_{b0}$ and $m_{b1}$ are the branch metrics computed by the metric generator 402 for the transition from state 0 and 1, respectively, at time $t_n$, to state 0 at time $t_{n+1}$. In this figure, the only two valid state transitions to state 0 at time $t_{n+1}$ are from state 0 and state 1 at time $t_n$. As shown, the sum of the path and branch metrics to state 0 at time $t_{n+1}$ produces two results as there are only two valid transitions. These are then compared and the minimum sum determines the most likely path into state 0 at time $t_{n+1}$. The previous state from which the most likely path came is stored along with the metric sum. Although not shown, this is repeated for all other trellis states at time $t_{n+1}$ and for each time period. The minimum metric sums produced at each trellis state at time $t_{n+1}$ become the respective path metrics used at time $t_{n+2}$, and so forth. As above, although selection of the minimum metric is used, other metrics may be used and the selection can be based on an alternate result such as the maximum value of the metric.

The memory 412 stores the most likely previous state and metric sum (i.e. path metric into the current state) in an array, where the position in the array represents both the current state and temporal position (i.e. time slice) within the received signal associated with the current state, for later retrieval. Once the end of the burst (or a suitable depth into the trellis) is reached, the processor 410 retrieves the array from the memory 412, determines the most likely current state by selection of the state with the minimum path metric or as determined by the terminal pilot symbols, and works backward from the starting state to the ending state (e.g., the initial state immediately after the initial pilot symbols) to determine the most likely set of state transitions and ultimately the received bit stream.

Figure 7A:
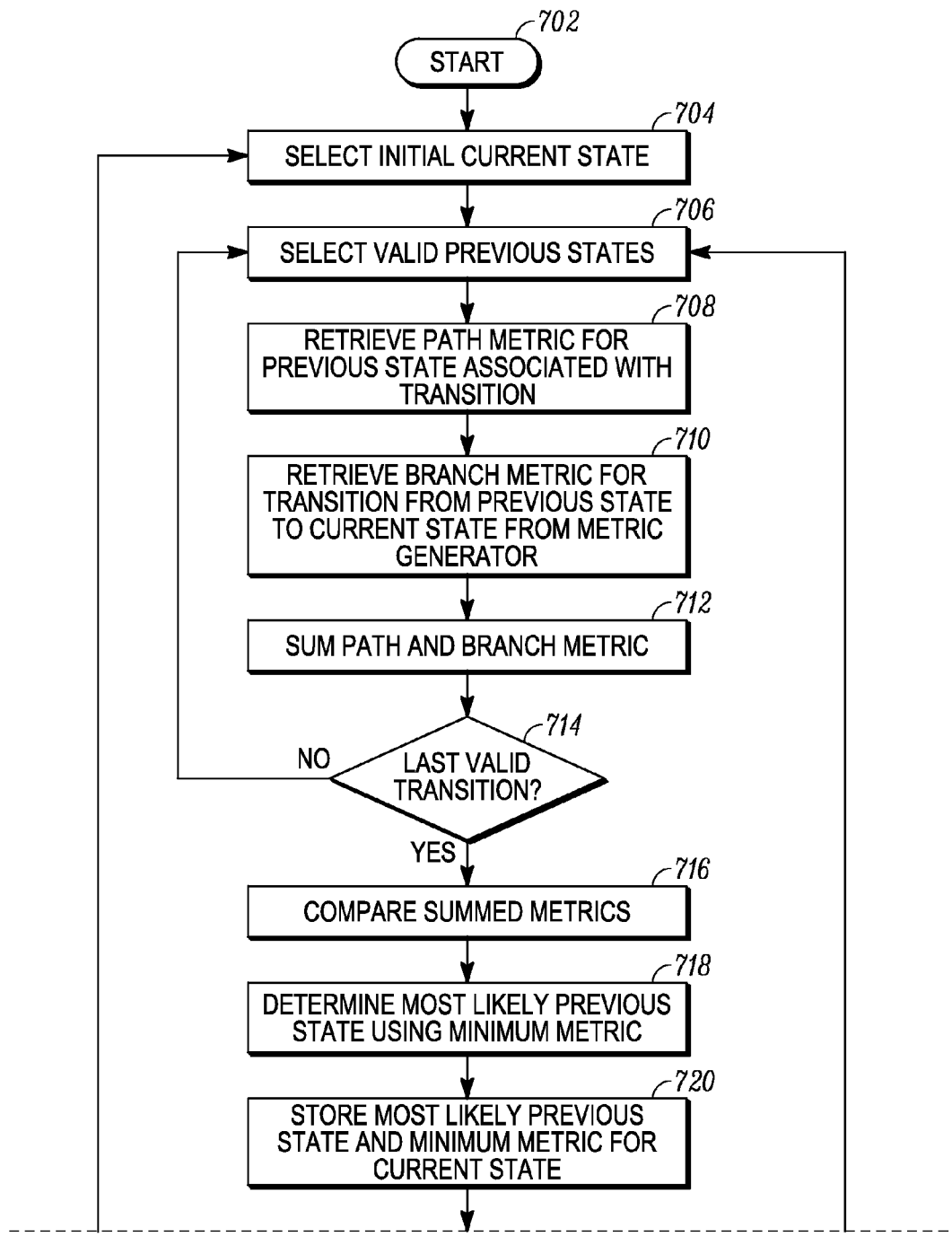
FIGS. 7A and 7B illustrate one embodiment of a flowchart of correcting for deviation error in a received signal.
Figure 7B:
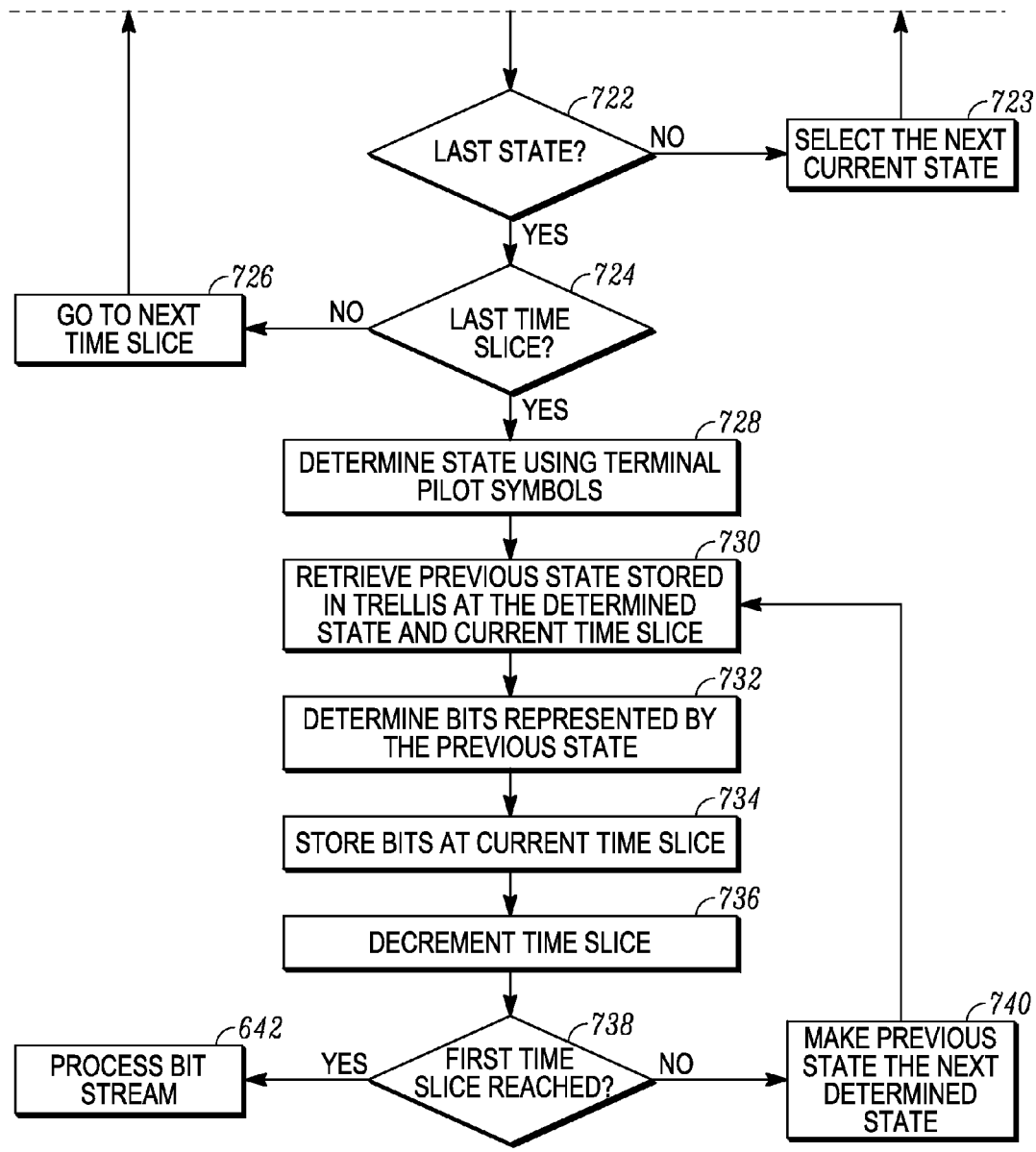

The operations of the processor 410 are shown in more detail in FIGS. 7A and 7B. When a current time slice is examined at step 702, an initial state is selected as the current state at step 704. A valid transition from a previous state to the current state is selected at step 706. The path metric for the previous state is retrieved from the memory at step 708 and the branch metric is retrieved from the metric generator 402 at step 710. The path metric and branch metric are then summed and stored in memory at step 712.

If it is determined at step 714 that there are more valid transitions (possible previous states to examine) for the current state, the process returns to step 706 where the next valid transition is selected. If, on the other hand, it is determined at step 714 that the last valid transition for the current state has been reached, the summed metrics for all of the valid transitions are compared at step 716 and the transition from the previous state to the current state with the minimum metric is determined to be the most likely transition at step 718. This previous state, along with its summed metric, is stored in an array of the memory associated with the time slice and the current state at step 720.

After storing the previous state and summed metric, if it is determined at step 722 that there are more current states to be determined, the next current state is selected at step 723 and the process returns to step 706 where a possible previous state of the next current state is selected. In one example, if there are 16 states and 4 possible previous states for each state, the processor chooses, of the 4 possible previous states for the current state, the previous state with the minimum combined path and branch metric for the current state, then moves to the next current state and again chooses, of the 4 possible previous states for the next current state, the previous state with the minimum combined path and branch metric for the next current state. This process continues until the most likely previous state for all 16 states is selected. The 4 possible previous states for the states are generally different, although there may be some overlap of individual possible previous states and certain states may have the same possible previous states.

Returning to step 722, if it is determined that all of the current states of the time slice have been examined, it is then determined at step 724 whether the end of the signal (last time slice) has been reached. If it determined at step 724 that additional time slices exist, the process advances at step 726 to the next time slice and returns to step 704, where the initial current state of the next time slice is selected. The entire process continues until both the path and branch metrics for all current states in all time slices have been determined, as is the most likely previous state for each current state. In progressing from one time slice to the immediately succeeding time slice, the path metric for each current state is updated. Specifically, the summed metric stored for each current state of the immediately preceding time slice becomes the path metric for the state in this next time slice. Thus, each current state in each time slice contains a history of the previous metrics (containing the path and branch metrics of each of the most likely previous states continuing to the original current state in the initial time slice).

If it is determined at step 724 that the last time slice has been reached (i.e., the terminal pilot symbols at the end of the signal burst have been reached), the processor then determines at step 728 the state ending with the terminal pilot symbols, and retrieves the previous state stored with the determined state from memory at step 730. The bits, which are inherent in the previous state, are determined at step 732 and stored in and array location representative of the current time slice in memory at step 734. In embodiments in which no terminal pilot symbols are present, the state with the minimum metric is selected.

The process of backing through the burst is repeated until all bits transmitted in the burst are determined The processor first decrements the time slice at step 736 and then determines at step 738 whether the initial time slice has been reached. If not, the previous state as determined from memory at step 730 is set as the next determined state at step 740 and the process returns to step 730, where the previous state stored with the next determined state and current time slice is retrieved from memory. Eventually, after the initial time slice has been reached (and thus the burst fully determined), the stored bit stream is processed at step 742.

Figure 8:
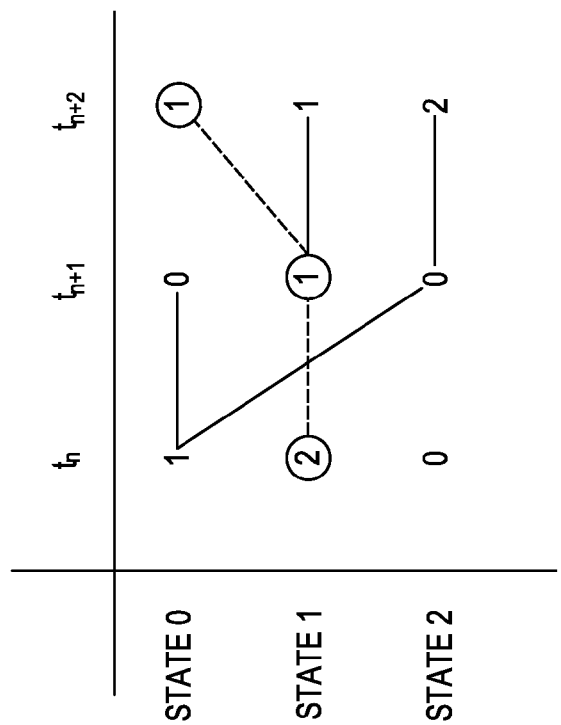
FIG. 8 illustrates one embodiment of the signal reconstruction process of FIG. 5.
Figure 8:
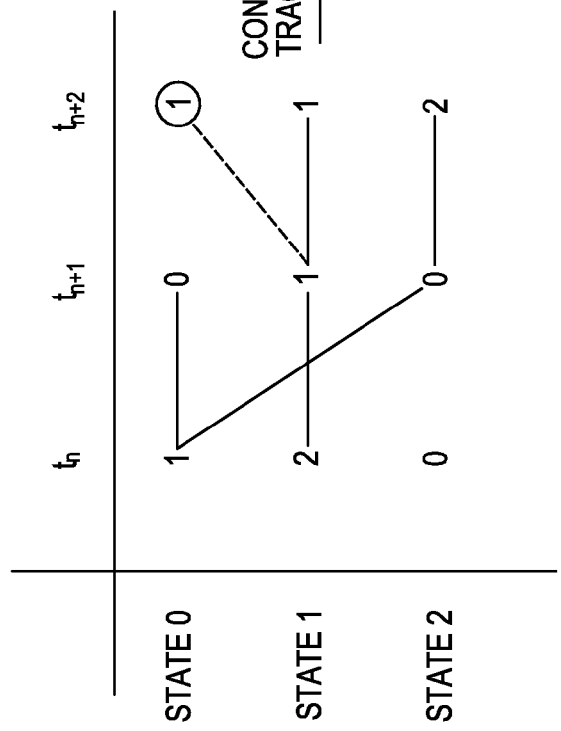

A simple example of this traceback process is shown in FIG. 8 in which the processor has reached time $t_{n+2}$ before tracing back through the burst. The process begins by determination of the most likely state at time $t_{n+2}$. In this example, state 0 is determined to be the most likely state at this time slice as illustrated by the circle around the previous state (numeral 1) stored at state 0. As the array illustrates, state 1 is the most likely previous state (the state at time $t_{n+1}$) from which a transition has occurred to state 0 at time $t_{n+2}$. In FIG. 7, the dotted lines show the most likely transitions with the solid lines showing less likely transitions. Several steps later, a more complete path is shown by the circled states and dotted lines in the figure on the bottom. Thus, as shown, the most likely sequence through the burst at times $t_n$, $t_{n+1}$ and $t_{n+2}$ are from state 1 to state 1 and then to state 0, respectively. This sequence of state transitions defines the transmitted bit stream.

In various embodiments, the algorithm may be implemented as a computer program product for use with a communication device such as a base station. Such implementations may include a series of computer instructions fixed either on a tangible medium, such as a computer readable medium (e.g., a diskette, CD-ROM, ROM, or fixed disk). The medium may be a tangible medium (e.g., optical or analog communications lines). The series of computer instructions embodies all or part of the functionality previously described herein with respect to the device. Those skilled in the art should appreciate that such computer instructions can be written in a number of programming languages for use with many device architectures or operating systems. Furthermore, such instructions may be stored in any memory device, such as semiconductor, magnetic, optical or other memory. It is expected that such a computer program product may be distributed as a removable medium with accompanying printed or electronic documentation (e.g., shrink wrapped software) or preloaded with a device (e.g., on system ROM or fixed disk). Of course, some embodiments of the invention may be implemented as a combination of both software (e.g., a computer program product) and hardware. Still other embodiments of the invention are implemented as entirely hardware, or entirely software (e.g., a computer program product).

Those skilled in the art will recognize that a wide variety of modifications, alterations, and combinations can be made with respect to the above described embodiments without departing from the spirit and scope of the invention defined by the claims, and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by any claims issuing from this application and all equivalents of those issued claims.

The invention claimed is:

1. A method for compensating deviation error in a signal received by a communication device, the signal comprising a plurality of time slices, each time slide containing one state of a plurality of states and each state formed by a plurality of quaternary symbols, the method comprising, at the communication device:
   estimating the deviation error in the signal;
   adjusting matched filter coefficients using the estimated deviation error by:
      identifying a current state;
      selecting a possible previous state of the current state, the current and previous states sharing at least one quaternary symbol;
      determining a set of quaternary symbols defined by the current and previous states;
      arranging the set of quaternary symbols into a symbol stream;
      convolving the symbol stream with a predetermined pulse shape to create a generated waveform;
      scaling the generated waveform using the estimated deviation error to form a scaled waveform;
      frequency modulating the scaled waveform to create a complex IQ waveform; and
      extracting the matched filter coefficients from the complex IQ waveform as adjusted matched filter coefficients;
   determining a plurality of metrics for the signal using the adjusted matched filter coefficients; and
   employing the metrics to determine the signal.

2. The method of claim 1, wherein the signal comprises a Harmonized Continuous Phase Modulation (H-CPM) sync or data burst that contains pilot symbols at the start and end of the sync or data burst, and the pilot symbols at at least one of the start or end of the sync or data burst are used in estimating the deviation error.

3. The method of claim 1, wherein the signal comprises a Harmonized Continuous Phase Modulation (H-CPM) sync burst containing sync symbols that are used in estimating the deviation error.

4. The method of claim 1, wherein when the signal is a current signal burst and the deviation of a known sequence is modeled as:

$$x[n] = e^{j\alpha q_p[n]} + w[n]$$

where $\alpha$ is the deviation, $q_p[n]$ is the known sequence, and $w[n]$ represents an Additive White Gaussian Noise sequence, when $x[n]$ has been multiplied with the known sequence having an ideal deviation $e^{-j\alpha_0 q_p[n]}$ (where $\alpha_0$ is the ideal deviation) such that the argument of the combination $r[n] = e^{j(\alpha - \alpha_0) q_p[n]} + w_r[n]$ is small, the estimate is:

$$\hat{\alpha} \cong \frac{\text{Im}\left\{\sum_{k=1}^{N-1}\sum_{i=k}^{N-1} r[i] r^*[i-k](q_p[i] - q_p[i-k])\right\}}{\text{Re}\left\{\sum_{k=1}^{N-1}\sum_{i=k}^{N-1} r[i] r^*[i-k](q_p[i] - q_p[i-k])^2\right\}}$$

where N is the number of samples being used to determine the estimate.

5. The method of claim 1, wherein extracting the matched filter coefficients from the complex IQ waveform comprises time windowing the complex IQ waveform by using a time slice that has a smaller temporal length than the complex IQ waveform.

6. The method of claim 1, wherein the plurality of quaternary symbols is able to form a plurality of states, possible previous states of the current state are a subset of the plurality of states, and adjusting matched filter coefficients further comprises extracting the matched filter coefficients for each of the possible previous states for each current state until all matched filter coefficients are extracted for all current states of the time slice.

7. The method of claim 6, wherein the matched filter coefficients are extracted at only one time slice of the signal.

8. The method of claim 6, wherein the matched filter coefficients are extracted at a plurality of time slices of the signal.

9. The method of claim 1, wherein consecutive symbols of the signal form a state and a metric is determined for each state, the method further comprising estimating distortions of the received signal caused by channel characteristics as a channel estimate, wherein the channel estimate is used in determining the metric for each state.

10. The method of claim 9, wherein each metric is proportional to the square of the magnitude of the difference between the signal and a combination of the channel estimate multiplied by the matched filter coefficient.

11. The method of claim 1, wherein consecutive symbols of the signal form a state and a metric is determined for each state, wherein employing the metrics to determine the received signal comprises, for each current state, determining the most likely current state and the most likely preceding state that immediately precedes the current state, wherein the current state and the preceding state overlap.

12. The method of claim 11, wherein each current state has a limited number of possible preceding states out of all possible states, determining the most likely current state comprises determining the minimum metric for all of the possible states, and determining the most likely preceding state for a particular current state comprises determining a path and branch metric for all of the possible preceding states associated with the particular current state.

13. The method of claim 12, wherein determining the most likely preceding state for a particular current state comprises:
for each possible preceding state of the particular current state, summing the path metric for the possible preceding state and the branch metric of a transition between the possible preceding state and the particular current state;
comparing the sums for all possible preceding states; and
selecting as the most likely preceding state the possible preceding state that has the minimum sum.

14. A receiver comprising:
a deviation estimator configured to estimate a deviation error in a burst received by the receiver, the burst containing a plurality of time slices, each time slice containing one state of a plurality of states, each state containing a plurality of symbols;
a matched filter coefficient generator configured to generate matched filter coefficients of all combinations of current and possible previous states using the estimated deviation error, each current state having a plurality of possible previous states at least one of whose symbols overlaps with that of the current state, generation of the matched filter coefficients including:
identify a particular current state;
select one of the possible previous states of the particular current state;
determine a set of quaternary symbols defined by the particular current and previous states;
arrange the set of quaternary symbols into a symbol stream;
convolve the symbol stream with a predetermined pulse shape to create a generated waveform;
scale the generated waveform to generate a scaled waveform;
frequency modulate the scaled waveform to create a complex IQ waveform; and
extract the matched filter coefficients from the complex IQ waveform;
a metric generator configured to determine a plurality of metrics for the signal using the matched filter coefficients and the burst; and
a processor configured to reproduce the burst using the plurality of metrics.

15. The receiver of claim 14, further comprising a channel tracker configured to provide to the metric generator a channel estimate of distortions of the burst caused by channel characteristics, the metric generator configured to use the channel estimate in determining the metrics.

16. The receiver of claim 14, wherein the matched filter coefficient generator is further configured to extract the matched filter coefficients using a time slice whose temporal length is smaller than that of the complex IQ waveform.

* * * * *